US012632038B2

(12) United States Patent
Suzuki

(10) Patent No.: US 12,632,038 B2
(45) Date of Patent: May 19, 2026

(54) CONTROL DEVICE

(71) Applicant: Fanuc Corporation, Minamitsuru-gun (JP)

(72) Inventor: Yoshiyuki Suzuki, Minamitsuru-gun (JP)

(73) Assignee: FANUC CORPORATION, Yamanashi (JP)

( * ) Notice: Subject to any disclaimer, the term of this patent is extended or adjusted under 35 U.S.C. 154(b) by 342 days.

(21) Appl. No.: 18/032,236

(22) PCT Filed: Nov. 1, 2021

(86) PCT No.: PCT/JP2021/040253
§ 371 (c)(1),
(2) Date: Apr. 17, 2023

(87) PCT Pub. No.: WO2022/097607
PCT Pub. Date: May 12, 2022

(65) Prior Publication Data
US 2023/0393560 A1     Dec. 7, 2023

(30) Foreign Application Priority Data
Nov. 5, 2020     (JP) ................................ 2020-184877

(51) Int. Cl.
*G05B 19/416*          (2006.01)
(52) U.S. Cl.
CPC .. *G05B 19/416* (2013.01); *G05B 2219/33081*
(2013.01)

(58) Field of Classification Search
None
See application file for complete search history.

(56) References Cited

U.S. PATENT DOCUMENTS 8,843,230 B2     9/2014  Mizuno et al.
10,261,498 B2     4/2019  Oota
(Continued)

FOREIGN PATENT DOCUMENTS

CN          107966956 A      4/2018
JP          H07-084611 A     3/1995
(Continued)

OTHER PUBLICATIONS

International Search Report and Written Opinion for International Application No. PCT/JP2021/040253, dated Jan. 25, 2022, 5 pages.
(Continued)

*Primary Examiner* — Ryan A Jarrett
(74) *Attorney, Agent, or Firm* — BUCHANAN INGERSOLL & ROONEY PC

(57)          ABSTRACT

A control device analyzes a control program and controls a plurality of controlled objects to operate in parallel based on the analysis results. This control device has functions of: detecting an adjustable interval in the control program; detecting wasted time that occurs in execution of commands related to waiting between the plurality of controlled objects in the control program; and adjusting speed and/or acceleration of a command related to the movement of an axis of the controlled object in the adjustable interval of the control program such as to reduce the detected wasted time.

6 Claims, 9 Drawing Sheets

(56) References Cited

U.S. PATENT DOCUMENTS

| | | | |
|---|---|---|---|
| 10,416,613 | B2 | 9/2019 | Uchida et al. |
| 10,838,405 | B2 | 11/2020 | Kuroki |
| 2012/0109359 | A1 | 5/2012 | Mizuno et al. |
| 2018/0113433 | A1 | 4/2018 | Ishiwari |
| 2019/0101881 | A1* | 4/2019 | Shimamura ............ G05B 19/05 |

FOREIGN PATENT DOCUMENTS

| | | | |
|---|---|---|---|
| JP | H07-160307 | A | 6/1995 |
| JP | 0973309 | A | 3/1997 |
| JP | 2003291033 | A | 10/2003 |
| JP | 2007122387 | A | 5/2007 |
| JP | 2007234002 | A | 9/2007 |
| JP | 2008-046899 | A | 2/2008 |
| JP | 2009-257221 | A | 11/2009 |
| JP | 2012-093975 | A | 5/2012 |
| JP | 4980458 | B2 | 7/2012 |
| JP | 2016062175 | A | 4/2016 |
| JP | 2016153938 | A | 8/2016 |
| JP | 2017-129972 | A | 7/2017 |
| JP | 2017146859 | A | 8/2017 |
| JP | 2018197989 | A | 12/2018 |

OTHER PUBLICATIONS

Office Action (The Second Office Action) issued Jul. 24, 2025, by the State Intellectual Property Office of People's Republic of China in corresponding Chinese Patent Application No. 202180074008.0 and an English translation of the Office Action. (25 pages).

Xiaolan et al., "Modeling for working accuracy of multi-axis synchronous numerical control machine with dynamic performance constraints" Journal of Chinese Agricultural Mechanization, (Dec. 2016), vol. 37, No. 12, pp. 41-47, with English translation. (22 pages).

Office Action (The First Office Action) issued Mar. 28, 2025, by the State Intellectual Property Office of People's Republic of China in corresponding Chinese Patent Application No. 202180074008.0 and an English translation of the Office Action. (24 pages).

Office Action (Decision of Refusal) issued Jan. 27, 2026, by the Japan Patent Office in corresponding Japanese Patent Application No. 2024-128623 and an English translation of the Office Action. (5 pages).

* cited by examiner

CONTROL DEVICE

CROSS REFERENCE TO RELATED APPLICATIONS

This is the U.S. National Phase application of PCT/JP2021/040253, filed Nov. 1, 2021 which claims priority to Japanese Patent Application No. 2020-184877, filed Nov. 5, 2020, the disclosures of these applications being incorporated herein by reference in their entireties for all purposes.

FIELD OF THE INVENTION

The present invention relates to a control device and more particularly to a control device that adjusts feed rate in consideration of wasted time.

BACKGROUND OF THE INVENTION

Control devices that control industrial machines such as machine tools or robots sometimes perform a plurality of control operations in parallel. The plurality of control operations may be performed, for example, in a multi-path system where the operations are controlled in parallel between the paths, or in a single-path system where controlled objects making up the system (such as a machine tool and its peripheral device, or a group of peripheral devices) are controlled in parallel. Parallel control is implemented by coordinated operations between a plurality of control programs, coordinated operations between blocks of a single control program, or coordinated operations between a plurality of commands in the same block.

One example of controlling a multi-path system is described, where a plurality of control programs control respective paths.

In multi-path control of a multi-path system that includes a plurality of machining paths or loader paths, wait control is sometimes performed to make actions in different paths wait for each other for coordinated operation (for example, PTL 1). Different control programs for different paths generally contain commands for controlling the respective paths. For wait control, each control program includes commands that instruct to "wait" for the actions in other paths or peripheral devices. Thus, the control programs of respective paths and peripheral devices wait for each other for coordinated operation. FIG. 9 shows an example of a control program that executes wait. According to the control program of FIG. 9, M101 command instructs to wait for actions in other paths, and temporarily stops the control program operation until a wait identifier 3 is sent from a path by WAIT(3) command. When the wait identifier 3 is sent from this path that has reached a predetermined state, the control program execution is restarted, and M200 command calls a loader. By this control program, execution of the loader call command can be kept waiting until the command that instructs to send a wait identifier 3 is executed in another path.

Another example of parallel control is described, where controlled objects making up a single-path system are controlled by a single control program in parallel.

In the case where a peripheral device is called and used in a single path, the control program runs continuously after executing a command for calling the peripheral device. If the blocks continuously executed include a block that cannot be executed until the peripheral device reaches a predetermined operating state (e.g., in which the drive unit of the peripheral device has moved to a predetermined position), a wait command in this block is executed to make the system wait for a signal that is sent when the peripheral device has reached the predetermined state. When the peripheral device has reached the predetermined state and the signal is sent, the wait command is cancelled and the control program continues running. Sometimes commands within the same block wait for one another.

PATENT LITERATURE

[PTL 1] Japanese Patent Application Publication No. 2016-153938

SUMMARY OF THE INVENTION

Let us now assume that one of a plurality of controlled objects operating in parallel has arrived earlier than a wait command that instructs to wait for an action of another controlled object. In such a case, this controlled object remains paused until the other controlled object reaches a predetermined state. This waiting time can be regarded as wasted time when we look at this controlled object's operation alone.

In another case, let us assume that one controlled object reaches a predetermined state later than the execution of a wait command. In such a case, the cycle time of the operation of the whole system is reduced by the delay of the controlled object to the predetermined state. This delay time can also be regarded as wasted time in terms of the whole system's operation.

Thus, there is a demand for a technique that effectively utilizes the wasted time that occurs in such a system in which a plurality of controlled objects operate in parallel.

Solution to Problem

The control device according to the present invention reduces wasted time, if any, in a system where a plurality of controlled objects are operated in parallel, by adjusting speed or acceleration of an adjustable interval of a command for controlling at least one of the plurality of controlled objects (e.g., an air cut interval where axial movement takes place without machining involved, or a machining interval where an adjustment of machining conditions will not cause any large issue). If an adjustment is made to reduce the speed and acceleration in the adjustable interval of the controlled object in which the waiting time occurs, the power consumption of the controlled object and the impact generated on the machine can be reduced. Further, if adjustment is made to increase the speed or acceleration in the adjustable interval of the controlled object in which delay time occurs, the cycle time of the whole system can be shortened. In either case, wasted time is reduced by the any adjustment.

The control device in one aspect of the present invention is a control device that performs parallel control of a plurality of different controlled objects to machine a workpiece based on at least one control program, and includes: an analysis unit that analyzes the control program; a control unit that controls the plurality of controlled objects based on a result of analysis by the analysis unit; an adjustable interval detection unit that detects an adjustable interval in the control program; a wasted time detection unit that detects wasted time that occurs in execution of commands in the control program that instruct the controlled objects to wait for each other; and a speed adjustment unit that adjusts at least one of speed and acceleration of a command that instructs movement of an axis of the controlled object in the adjustable interval of the control program such as to reduce the wasted time.

According to one aspect of the present invention, wasted time that occurs in a system where a plurality of controlled objects are operated in parallel can be converted into reductions in power consumption and impacts that occur on machines, and shortened cycle times, and the wasted time also can be effectively utilized.

BRIEF DESCRIPTION OF DRAWINGS

FIG. 1 is a schematic hardware configuration diagram of a control device according to a first embodiment.

FIG. 5 is a graph showing an example of a relationship between changes in speed and time in another path.

FIG. 6 is a graph showing an example of the results of a process for reducing delay time.

FIG. 8 is a schematic block diagram illustrating the functions of the control device according to a third embodiment.

DETAILED DESCRIPTION OF EMBODIMENTS OF THE INVENTION

Figure 2:
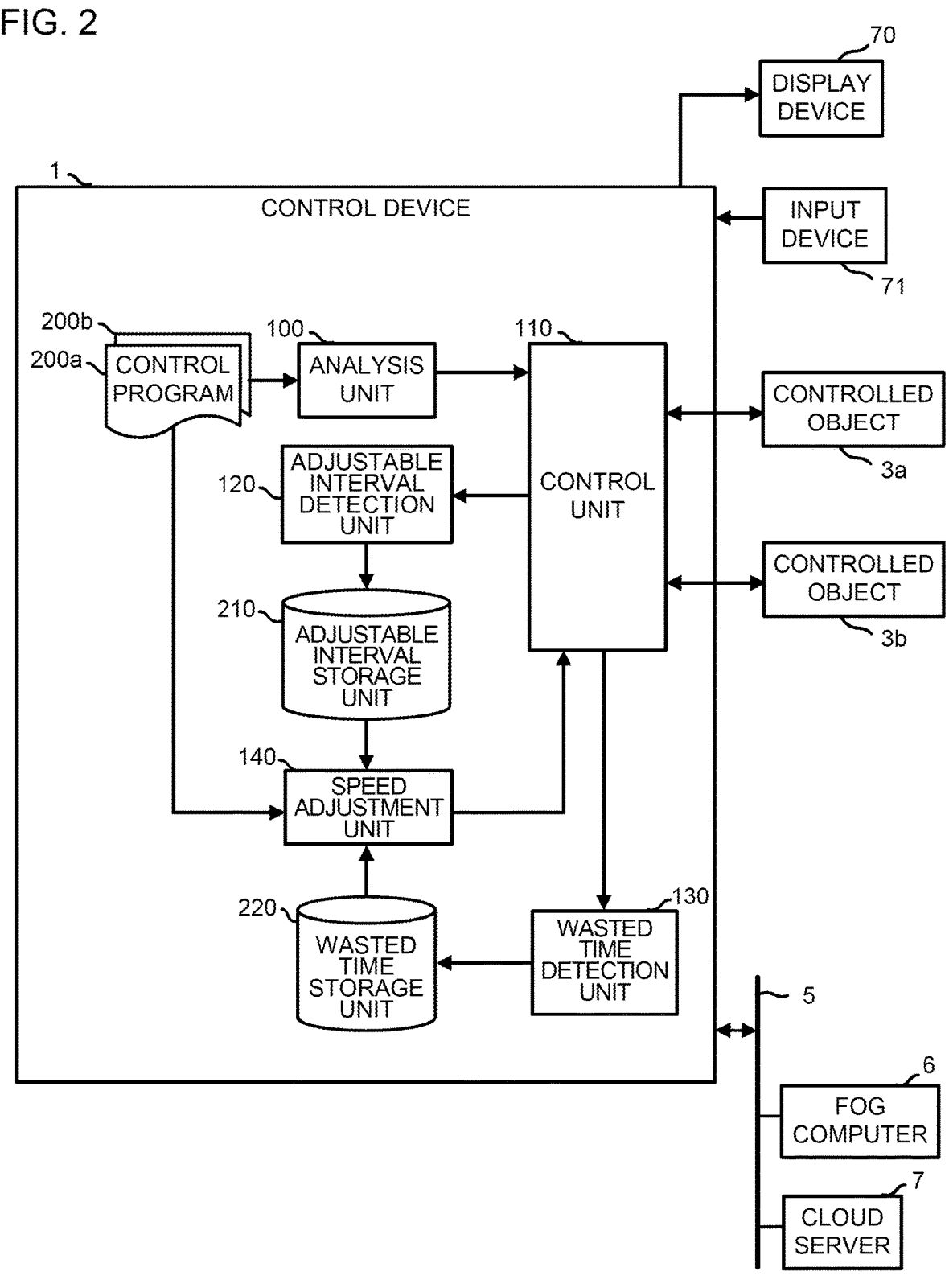
FIG. 2 is a schematic block diagram illustrating the functions of the control device according to the first embodiment.

Embodiments of the present invention will be hereinafter described with reference to the drawings.

Figure 1:
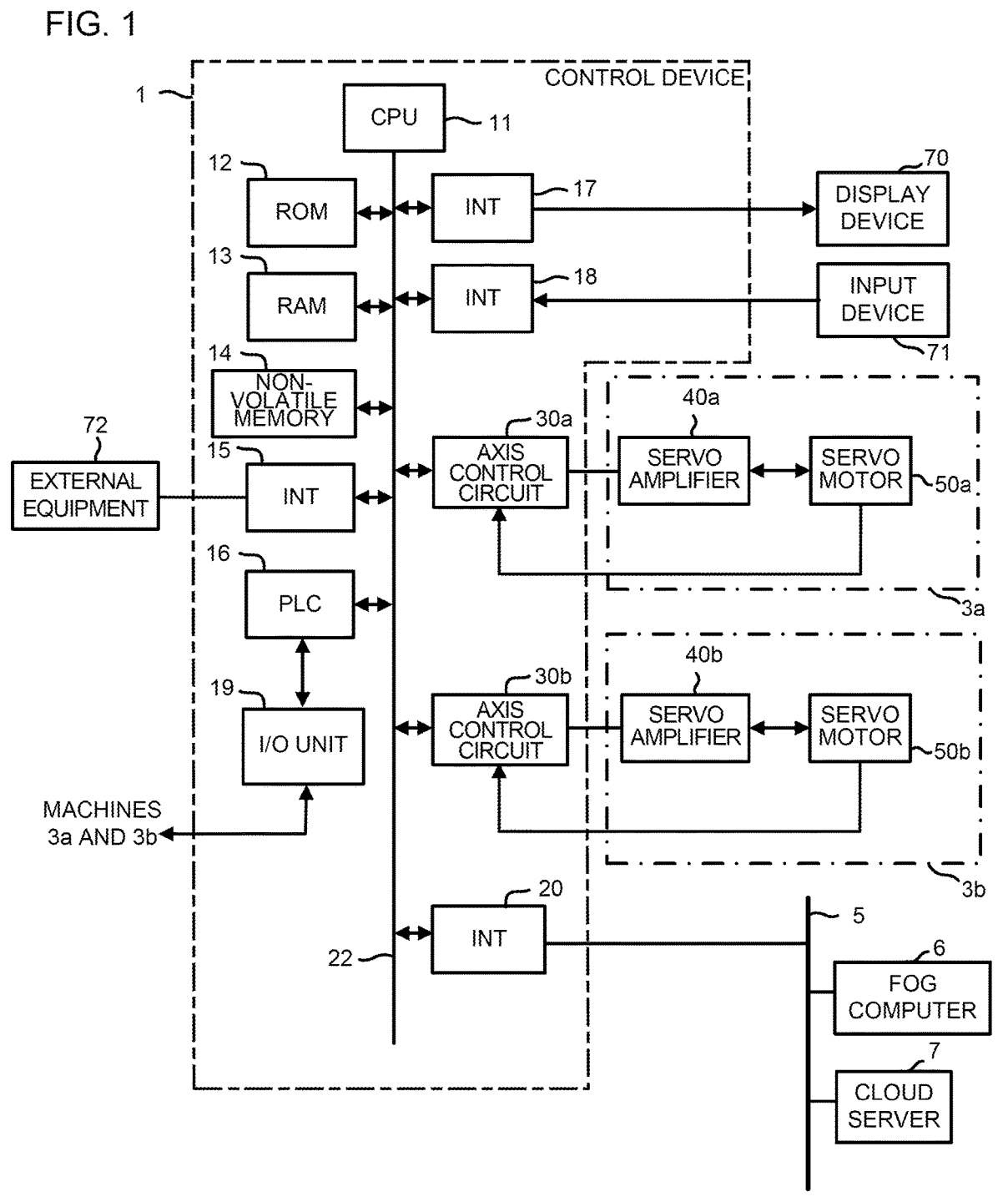

FIG. 1 is a schematic hardware configuration diagram illustrating major parts of a control device according to a first embodiment of the present invention.

In this embodiment, one example will be described in which the functions of the control device of the present invention are used in the case where a plurality of controlled objects are controlled in parallel by a plurality of control programs. The control device 1 of the present invention may be mounted for example as a controller that controls objects 3a and 3b based on control programs each prepared for each of the controlled objects. The functions of the control device 1 of the present invention may also be applied to a case where a plurality of controlled objects 3a and 3b are controlled in parallel by a single control program.

The CPU 11 of the control device 1 according to this embodiment is a processor that performs control of the control device 1 as a whole. The CPU 11 reads out a system program stored in a ROM 12 via a bus 22 and controls the entire control device 1 in accordance with the system program. A RAM 13 temporarily stores transient calculation data, display data, and various types of data input from outside.

A non-volatile memory 14 is made up of a memory backed up by a battery (not shown), and an SSD (Solid State Drive) or the like, for example, and retains stored data even when the control device 1 is turned off. The non-volatile memory 14 stores control programs and data taken in from external equipment 72 via an interface 15, control programs and data input from an input device 71 via an interface 18, and control programs and data acquired from other machines such as a fog computer 6 or a cloud server 7 via a network 5. The data stored in the non-volatile memory 14 may include data related to, for example, the position, speed, acceleration, load of each of the motors in the controlled objects 3a and 3b, and various physical quantities detected by sensors (not shown) attached to other controlled objects 3a and 3b. The control programs and data stored in the non-volatile memory 14 may be deployed in the RAM 13 when executed or used. Various system programs such as well-known analysis programs are written in the ROM 12 beforehand.

The interface 15 is an interface for connecting the CPU 11 of the control device 1 with external equipment 72 such as external storage media. Control programs or various settings data, for example, to be used for the control of the controlled objects 3a and 3b are read from the external equipment 72. Control programs and settings data edited in the control device 1 may be stored in external storage media such as a CF card or USB memory (not shown) via the external equipment 72. A PLC (Programmable Logic Controller) 16 controls the controlled objects 3a and 3b and peripheral devices of the controlled objects 3a and 3b (such as, for example, a tool exchanger, actuators of a robot or the like, sensors such as temperature or humidity sensors attached to the controlled objects 3a and 3b, etc.) by executing a ladder program and outputting signals via an I/O unit 19. The PLC 16 receives signals from various switches equipped in the main bodies of the controlled objects 3a and 3b or from peripheral devices, performs necessary processing to the signals, and then transmits the signals to the CPU 11.

The interface 20 is an interface for connecting the CPU of the control device 1 with a wired or wireless network 5. The network 5 may be any network that uses communication techniques including, for example, a serial communication such as RS-485, Ethernet®, optical communications, wireless LAN, Wi-Fi®, Bluetooth® and so on. To the network 5 are connected other machines and upper tier management apparatuses such as fog computer 6, cloud server 7, etc., which exchange data with the control device 1.

A display device 70 displays the data read into the memory, and the data acquired as the results of execution of a program, output via an interface 17, on a screen thereof. The input device 71, which is composed of a keyboard, a pointing device, and so on, transmits instructions based on operations by an operator, data and so on, to the CPU 11 via an interface 18.

Axis control circuits 30a and 30b for controlling the axes of the controlled objects 3a and 3b receive the motion command amounts of axes from the CPU 11 and output the axis commands to respective servo amplifiers 40a and 40b. The servo amplifiers 40a and 40b receive this command and then drive serve motors 50a and 50b, respectively, for moving the drive units of the controlled objects 3a and 3b along axes. The axis servo motors 50a and 50b include built-in position/speed detectors and perform feedback control of position and speed by feeding back the position/speed feedback signals from the position/speed detectors to the respective axis control circuits 30a and 30b. While the hardware configuration diagram of FIG. 1 illustrates only one each axis control circuit 30a or 30b, servo amplifier 40a or 40b, and servo motor 50a or 50b, in actual practice there are provided the same number of these components as that of the axes equipped in the controlled objects 3a and 3b.

FIG. 2 is a schematic block diagram illustrating the functions of the control device 1 according to the first embodiment of the present invention. Various functions of the control device 1 of this embodiment are realized by the CPU 11 of the control device 1 illustrated in FIG. 1 executing a system program to control the operation of various parts of the control device 1.

The control device 1 of this embodiment includes an analysis unit 100, a control unit 110, an adjustable interval detection unit 120, a wasted time detection unit 130, and a speed adjustment unit 140. The RAM 13 and non-volatile memory 14 of the control device 1 store control programs 200*a* and 200*b* for controlling the controlled objects 3*a* and 3*b* respectively, and are each provided with an adjustable interval storage unit 210, which is an area for storing adjustable intervals in the control programs 200*a* and 200*b*, and a wasted time storage unit 220, which is an area for storing positions and times in commands of the control programs 200*a* and 200*b* where wasted time occurs.

The analysis unit 100 is realized by the CPU 11 of the control device 1 shown in FIG. 1 executing the system program read out from the ROM 12 and primarily performing arithmetic processing using the RAM 13 and non-volatile memory 14. The analysis unit 100 analyzes the control programs 200*a* and 200*b* and creates command data for controlling the controlled objects 3*a* and 3*b* equipped with the servo motors 50*a* and 50*b*. The control programs 200*a* and 200*b* include commands that are commonly used for the control of the controlled objects 3*a* and 3*b*. The commands that are commonly used include wait commands and the like. The analysis unit 100 outputs the command data created based on the commands of the control programs 200*a* and 200*b* to the control unit 110.

The control unit 110 is realized by the CPU 11 of control device 1 shown in FIG. 1 executing the system program read out from the ROM 12 and primarily performing: arithmetic processing using the RAM 13 and non-volatile memory 14; control operations of various parts of the controlled objects 3*a* and 3*b* using the axis control circuits 30*a*, 30*b* and PLC 16; and input/output operations using the interface 18. The control unit 110 controls various parts of the controlled objects 3*a* and 3*b* and peripheral devices based on the command data input from the analysis unit 100. For example, the control unit 110 generates data regarding the movement along axes based on the commands for moving the drive units along the axes of the controlled objects 3*a* and 3*b* and outputs the data to the servo motors 50*a* and 50*b*. Moreover, the control unit 110 generates predetermined signals for operating peripheral devices of the controlled objects 3*a* and 3*b*, for example, based on the commands for operating these peripheral devices, and outputs the signals to the PLC 16. Meanwhile, the control unit 110 acquires the states of the servo motors 50*a* and 50*b* (current values, positions, speeds, accelerations, loads, and so on of motors) as feedback values and use the feedback values for each control operations.

The adjustable interval detection unit 120 is realized by the CPU 11 of the control device 1 shown in FIG. 1 executing the system program read out from the ROM 12 and primarily performing arithmetic processing using the RAM 13 and non-volatile memory 14. The adjustable interval detection unit 120 detects an adjustment interval that allows adjustment of speed or acceleration from the intervals for axis feed control of the controlled objects 3*a* and 3*b* in the control programs 200*a* and 200*b*. The adjustable interval detection unit 120 detects an interval where an air cut was performed in the controlled objects 3*a* and 3*b* as an adjustable interval, based on the state of control by the control unit 110 or the feedback values fed back from the controlled objects 3*a* and 3*b*, for example. The adjustable interval detection unit 120 associates the detected adjustment interval with a command in the control programs 200*a* and 200*b* and stores the interval in the adjustable interval storage unit 210. In this case, the adjustable interval detection unit 120 may detect an interval of a fast feed command, for example, as an adjustable interval. The adjustable interval detection unit 120 may also detect an interval of a cutting feed command, for example, in which the feedback values of loads sent from the servo motors 50*a* and 50*b* that drive the axes are smaller than a predetermined threshold, as an adjustable interval.

The adjustable interval detection unit 120 may also detect a cutting interval in which adjustment of the machining conditions does not cause any major problems, within the intervals in which the workpiece is machined, as an adjustable interval. In this case, the adjustable interval detection unit 120 may detect, for example, a cutting interval in which a cutting feed is commanded and a long range is machined, as an adjustable interval. When adjusting the speed or acceleration of the axis in a cutting interval in which a long range is machined, such a cutting interval can be set as an adjustable interval because a minute amount of adjustment can eliminate wasted time. The adjustable interval detection unit 120 may also detect an interval of a cutting feed which is previously machined as an adjustable interval, for example, when the interval where the cutting feed is commanded and the same part is machined in the previous machining.

The wasted time detection unit 130 is realized by the CPU 11 of the control device 1 shown in FIG. 1 executing the system program read out from the ROM 12 and primarily performing arithmetic processing using the RAM 13 and non-volatile memory 14. The wasted time detection unit 130 detects wasted time that occurred in the controlled objects 3*a* and 3*b* based on the state of control by the control unit 110, associates the wasted time with a command in the control programs 200*a* and 200*b*, and stores the wasted time in the wasted time storage unit 220. The wasted time stored in the wasted time storage unit 220 may include at least the time (waiting time) that has passed after a wait command was executed in a control program of a certain controlled object until this wait command was cleared. The wasted time stored in the wasted time storage unit 220 may also include the time (delay time) that elapsed after a wait command was executed in a control program of another controlled object until a wait identifier was sent.

The speed adjustment unit 140 is realized by the CPU 11 of the control device 1 shown in FIG. 1 executing the system program read out from the ROM 12 and primarily performing arithmetic processing using the RAM 13 and non-volatile memory 14. The speed adjustment unit 140 adjusts at least one of speed and acceleration of the commands of the adjustable interval in the control programs 200*a* and 200*b* such as to reduce the wasted time, with reference to the adjustable intervals stored in the adjustable interval storage unit 210 and the wasted time stored in the wasted time storage unit 220. In making adjustments, the speed adjustment unit 140 may give priority to an air cut interval among the adjustable intervals. For adjustment to reduce delay time in the wasted time, in particular, it is desirable to give priority to an air cut interval, and to not adjust for cutting intervals. This is because increasing speed or acceleration of a cutting interval often causes problems with the machined surface. On the other hand, for adjustment to reduce waiting time in the wasted time, the speed adjustment unit 140 may adjust cutting intervals.

One example of speed adjustment by the speed adjustment unit 140 for reducing waiting time will be described with reference to FIG. 3 and FIG. 4.

Figure 3:
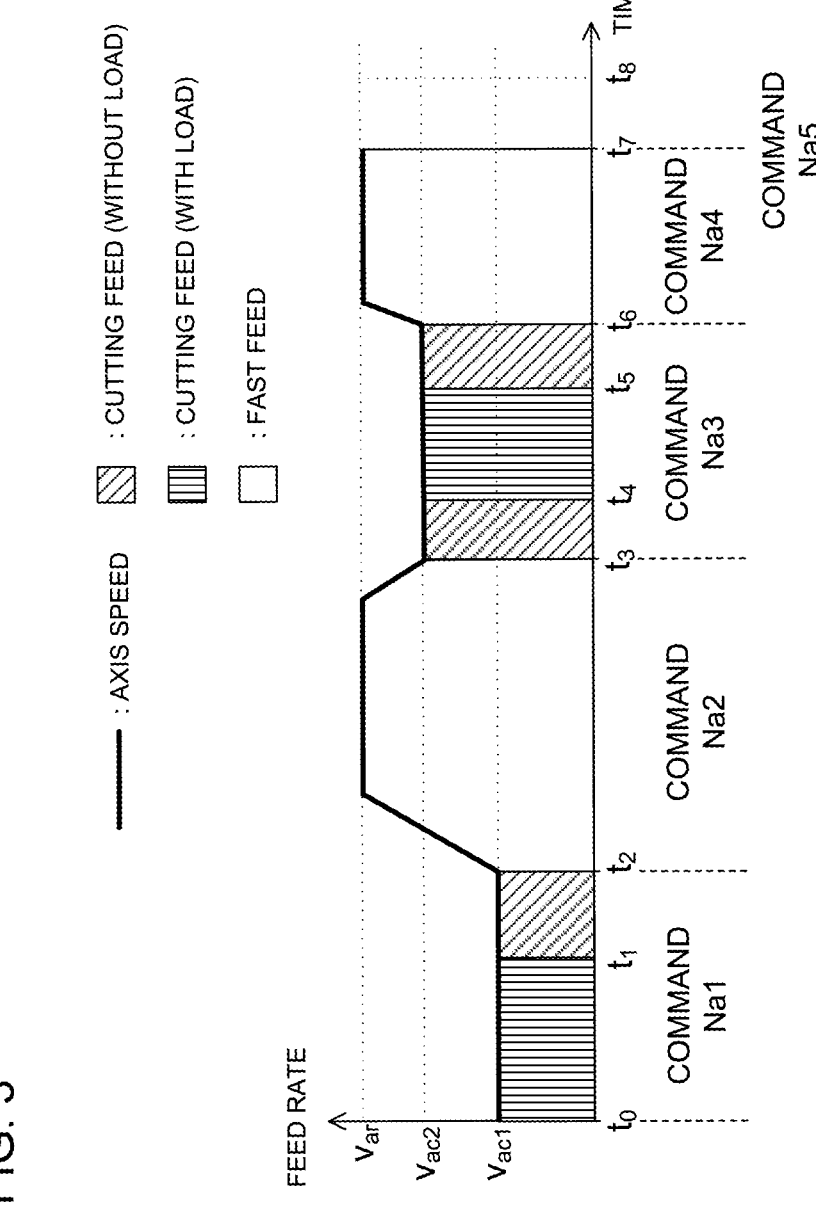
FIG. 3 is a graph showing an example of a relationship between changes in speed and time in one path.

FIG. 3 is a graph showing an example of a relationship between the axial feed rate and the time in the controlled object 3a. In FIG. 3, the horizontal hatched section indicates the cutting feed intervals when the cutting load is equal to or higher than a predetermined threshold, the oblique hitched section indicates the cutting feed intervals when the cutting load is equal to or lower than a predetermined threshold, and the blank indicates fast feed intervals. Of these, the cutting feed intervals with a cutting load of a predetermined threshold or lower and the fast feed intervals can be considered as adjustable intervals. In the example of FIG. 3, cutting feed command Na1 is executed from time $t_0$ to $t_2$, and cutting feed command Na3 is executed from time $t_3$ to $t_6$, fast feed command Na2 and fast feed command Na4 are respectively executed from time $t_2$ to $t_3$ and time $t_6$ to $t_7$. Wait command Na5 is executed at time $t_7$ so that the controlled object 3a goes into a wait state, and at time $t_8$, the control program 200b of the controlled object 3b instructs to send a wait identifier so that the wait state is cleared.

FIG. 3 shows that from time $t_1$ to $t_2$, time $t_3$ to $t_4$, and time $t_5$ to $t_6$, no load is detected even though the cutting feed commands are executed. Therefore, the cutting feed intervals from time $t_1$ to $t_2$, time $t_3$ to $t_4$, and time $t_5$ to $t_6$ are stored as adjustable intervals in the adjustable interval storage unit 210. Similarly, fast feed intervals from time $t_2$ to $t_3$ and time $t_6$ to $t_7$ are stored as adjustable intervals in the adjustable interval storage unit 210. The period from time $t_7$ when wait command Na5 was executed to time $t_8$ when the wait state was cleared can be considered as waiting time, and therefore time $(t_8-t_7)$ is stored in the wasted time storage unit 220 as wasted time (waiting time) on the command Na5.

In such a situation, the speed adjustment unit 140 makes adjustments to reduce, for example, the cutting feed rate $v_{ac1}$ or acceleration from time $t_1$ to $t_2$, the fast feed rate $v_{ar}$ or acceleration from time $t_2$ to $t_3$ or time $t_6$ to $t_7$, and the cutting feed rate $v_{ac2}$ or acceleration from time $t_3$ to $t_4$ or time $t_5$ to $t_6$, so that the time point when command Na5 is executed will approximately coincide with time $t_8$.

Figure 4:
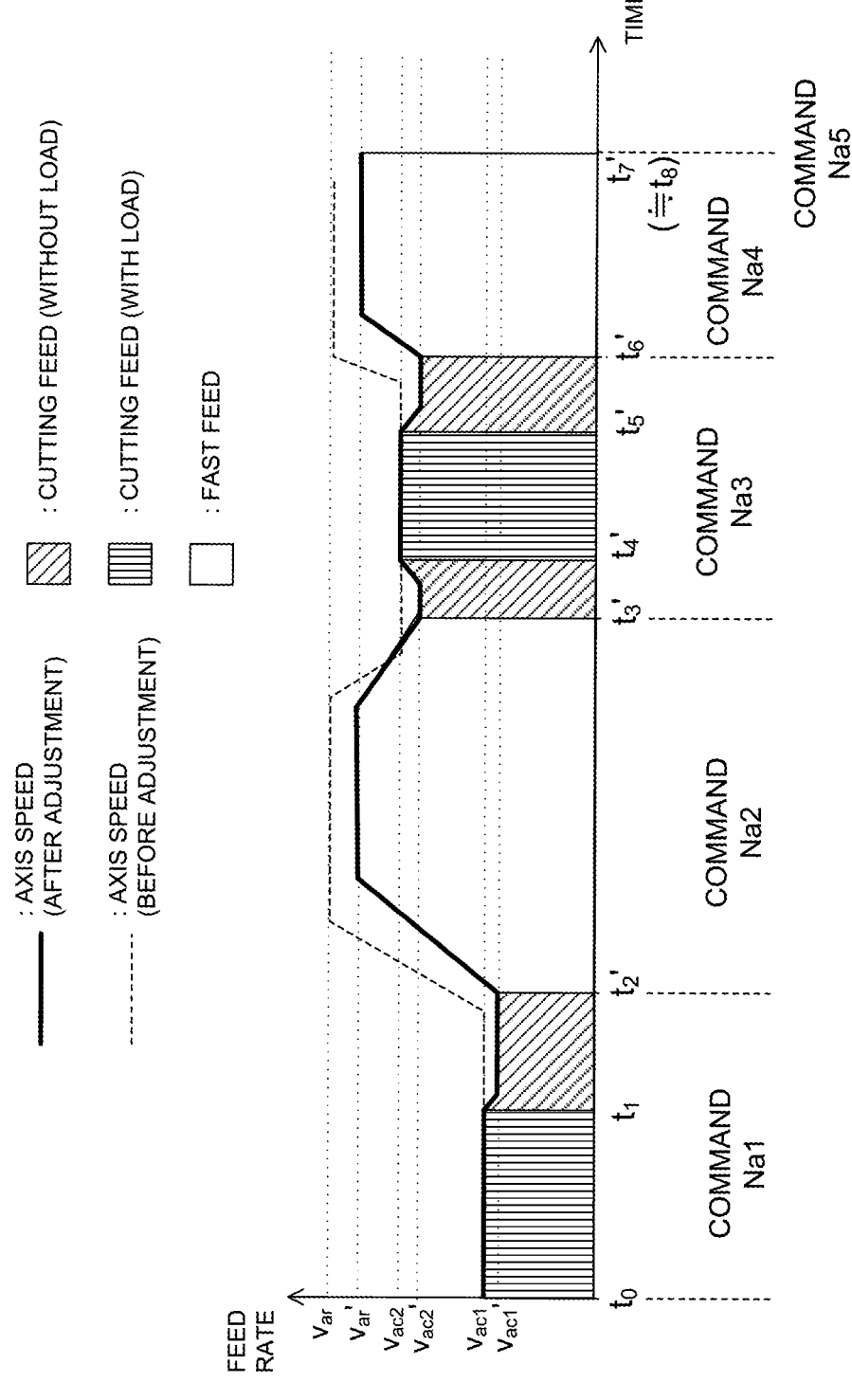
FIG. 4 is a graph showing an example of the results of a process for reducing waiting time.

FIG. 4 is a graph showing an example of a relationship between the axial feed rate and the time of the controlled object 3a after speed in adjustable intervals has been adjusted.

FIG. 4 shows a case where speed and acceleration in adjustable intervals were adjusted so that time $t_7'$ at which the movement by fast feed command Na4 ends coincides with time $t_8$. This speed adjustment can be implemented by instructing the control unit 110 to set a small override in the adjustable interval, for example. The end time $t_7'$ of fast feed command Na4 can be coincided with time $t_8$ by calculating the changes in position of axes in accordance with the adjustment of the override. At this time, at least one of speed or acceleration is adjusted such that the integral of speed (amount of movement) during the execution of each command matches the integral of speed during the execution of each command in FIG. 3. While speed or acceleration is adjusted in all of the adjustable intervals in FIG. 4, speed or acceleration may be adjusted in only some of the adjustable intervals. In such case, for example, speed or acceleration of fast feed command N2, which involves a large change in speed, may be adjusted in the case of FIG. 3 such that time $t_7'$ at which the movement by fast feed command Na4 ends coincides with time $t_8$. This provides a large effect to reduce power consumption and possible impact on machines.

Next, one example of speed adjustment by the speed adjustment unit 140 for reducing delay time will be described with reference to FIG. 5 and FIG. 6.

Figure 5:
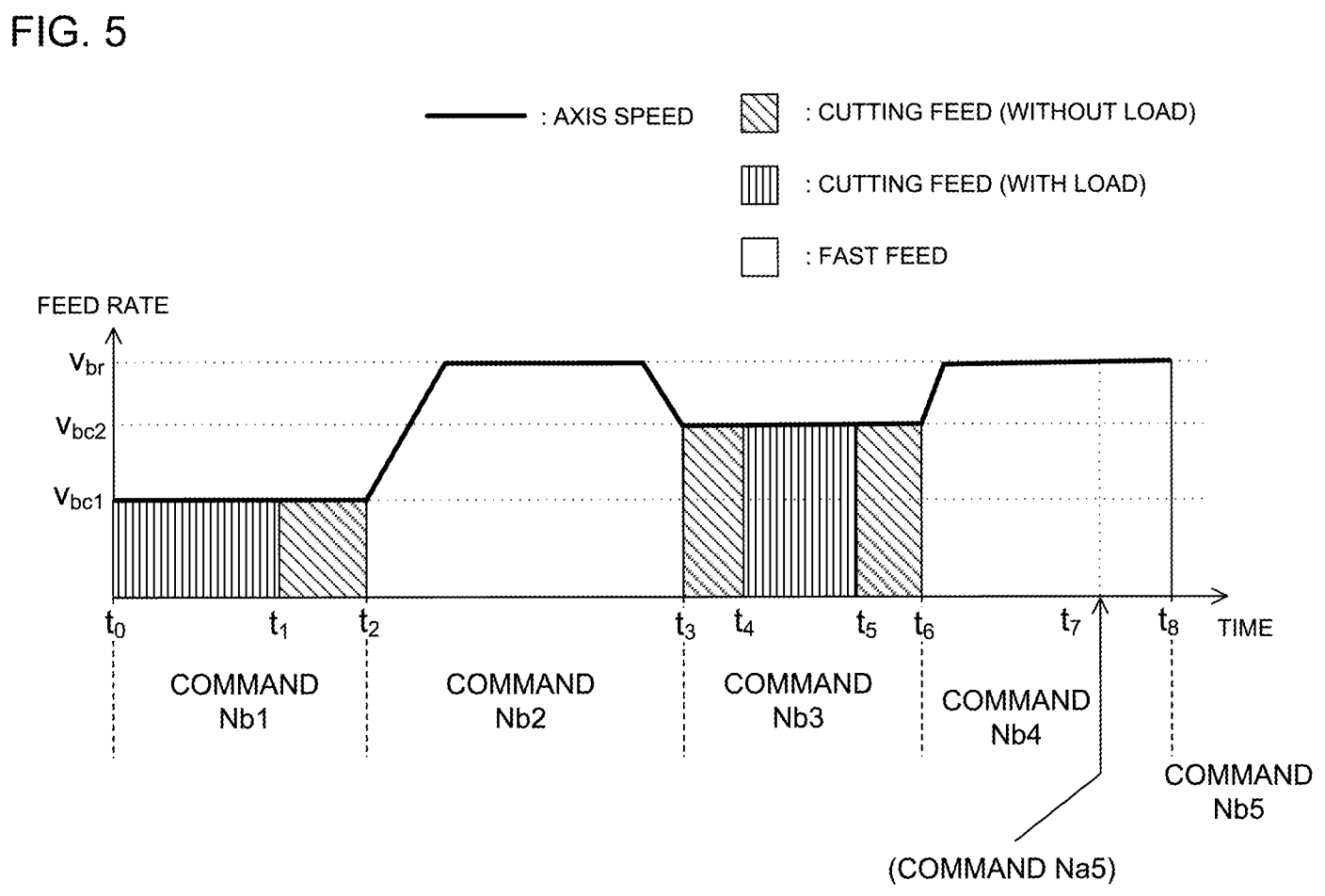

FIG. 5 is a graph showing an example of a relationship between the axial feed rate and the time in the controlled object 3b. In FIG. 5, the horizontal hatched section indicates the cutting feed intervals when the cutting load is equal to or higher than a predetermined threshold, the oblique hitched section indicates the cutting feed intervals when the cutting load is equal to or lower than a predetermined threshold, and the blank indicates fast feed intervals. In the example of FIG. 5, cutting feed command Nb1 is executed from time $t_0$ to $t_2$, and cutting feed command Nb3 is executed from time $t_3$ to $t_6$, fast feed command Nb2 and fast feed command Nb4 are respectively executed from time $t_2$ to $t_3$ and time $t_6$ to $t_7$. Wait command Na5 is executed at time $t_7$ by the control program 200a for the controlled object 3a to go into a state of wait for the controlled object 3b, and at time $t_8$, the control program 200b of the controlled object 3b executes command Nb5 to send a wait identifier so that the wait state of the controlled object 3a is cleared.

FIG. 5 shows that from time $t_1$ to $t_2$, time $t_3$ to $t_4$, and time $t_5$ to $t_6$, no load is detected even though the cutting feed commands are executed. Therefore, the cutting feed intervals from time $t_1$ to $t_2$, time $t_3$ to $t_4$, and time $t_5$ to $t_6$ are stored as adjustable intervals in the adjustable interval storage unit 210. Similarly, the fast feed intervals from time $t_2$ to $t_3$ and time $t_6$ to $t_7$ are stored as adjustable intervals in the adjustable interval storage unit 210. The period from time $t_7$ when wait command Na5 was executed by the control program 200a of the controlled object 3a to time $t_8$ when command Nb5 to send a wait identifier was executed by the control program 200b of the controlled object 3b can be considered delay time, and therefore time $(t_8-t_7)$ is stored in the wasted time storage unit 220 as wasted time (delay time) on the command Nb5.

In such a situation, the speed adjustment unit 140 makes an adjustment to increase, for example, the cutting feed rate $v_{bc1}$ or acceleration from time $t_1$ to $t_2$, the fast feed rate $v_{br}$ or acceleration from time $t_2$ to $t_3$ or time $t_6$ to $t_7$, or the cutting feed rate $vb_{c2}$ or acceleration from time $t_3$ to $t_4$ or time $t_5$ to $t_6$, so that the time point when the command Nb5 is executed will approximately coincide with time $t_7$.

Figure 6:
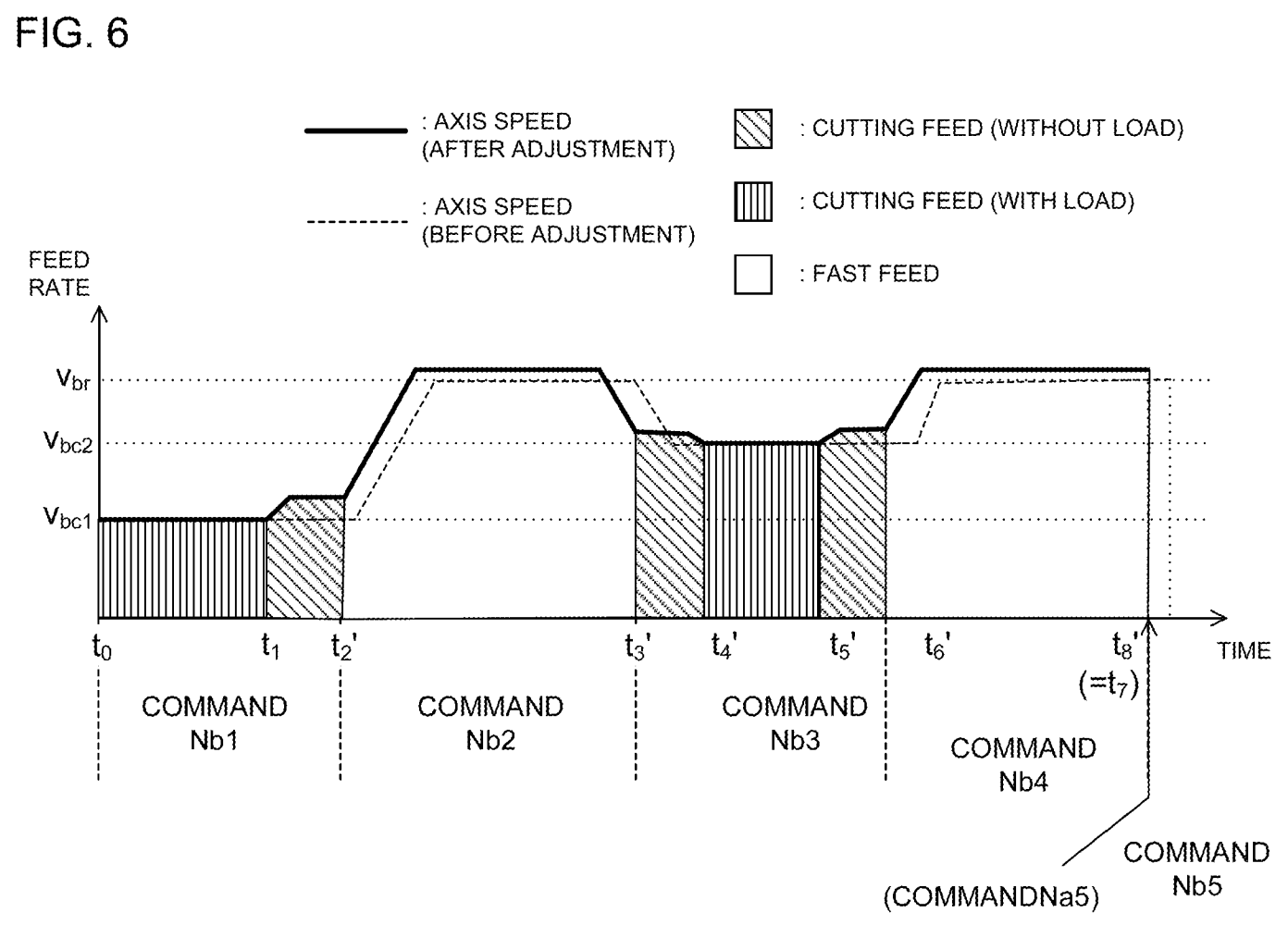

FIG. 6 is a graph showing an example of a relationship between the axial feed rate and the time of the controlled object 3b after speed in adjustable intervals has been adjusted. FIG. 6 shows a case where speed and acceleration in adjustable intervals were adjusted so that time $t_8'$ at which the movement by fast feed command Nb4 ends coincides with time $t_7$. This speed adjustment can be implemented by instructing the control unit 110 to set a large override in the adjustable interval, for example. The end time $t_8'$ of fast feed command Nb4 can be coincided with time $t_7$ by calculating the changes in position of axes in accordance with the adjustment of the override. At this time, at least one of speed or acceleration is adjusted such that the integral of speed (amount of movement) during the execution of each command matches the integral of speed during the execution of each command in FIG. 5. While speed or acceleration is adjusted in all of the adjustable intervals in FIG. 6, speed or acceleration may be adjusted in only some of the adjustable intervals.

In the above, one case of reducing waiting time and one case of reducing delay time by the speed adjustment unit 140 are described. The speed adjustment unit 140 may also perform reduction of waiting time of one controlled object and reduction of delay time of another controlled object in combination. In this case, for example, priority is given to reducing the waiting time and reducing the delay time, and the waste time with the higher priority is reduced first, and then, the amount that could not be adjusted should be compensated by reducing the wasted time of the lower priority. For example, priority is given to reducing the waiting time, the waiting time is reduced under a predetermined limit (For example, speed or acceleration must not be reduced below a predetermined threshold, speed or acceleration must not be reduced by more than 10% from the commanded speed, and so on.), and then, if the waiting time cannot be reduced to 0, adjustment may be made to shorten the delay time of other controlled objects. Alternatively, for example, priority is given to reducing the delay, and the delay time is reduced under a predetermined limit (For example, do not increase the speed limit or acceleration limit of the axis according to the machine specifications, and so on.), and then, if the delay time cannot be reduced to 0, adjustment may be made to reduce the waiting time of other controlled objects.

The speed adjustment unit 140 cannot adjust at least one of speed and acceleration for the control programs 220*a* and 220*b*, when the adjustable section storage unit 210 does not store any adjustable section or when the dead time storage section 220 does not store any dead time. In this embodiment, detection of adjustable intervals by the adjustable interval detection unit 120 and detection of wasted time by the wasted time detection unit 130 are performed during the control of controlled objects 3*a* and 3*b* by the control unit 110. Therefore, the speed adjustment unit 140 does not function in machining the first workpiece in this embodiment. However, the machining of the workpiece by the machine is performed repeatedly in automatic operation. Therefore, it should be noted that the speed adjustment by the speed adjusting unit 140 functions favorably in the second and subsequent machining by using the adjustable intervals and the wasted time detected in the first machining.

In the control device 1 having the above configuration, it is possible to use effectively the wasted time that occurs in a system that controls multiple control targets in parallel by reducing power consumption, reducing possible impact on machines, and reducing the cycle time. Namely, when there is a wasteful waiting time, it is possible to reduce the power consumption and possible impact generated on the machine without reducing the cycle time. On the other hand, when there is a wasteful delay time, it is possible to increase the cycle time without increasing the power consumption and possible impact generated on the machine more than necessary. By applying the present invention to a control device that controls a plurality of controlled objects in a multi-system machine or a line, it is possible to increase the cycle time and reduce the power consumption and possible impact generated on the machine.

Figure 7:
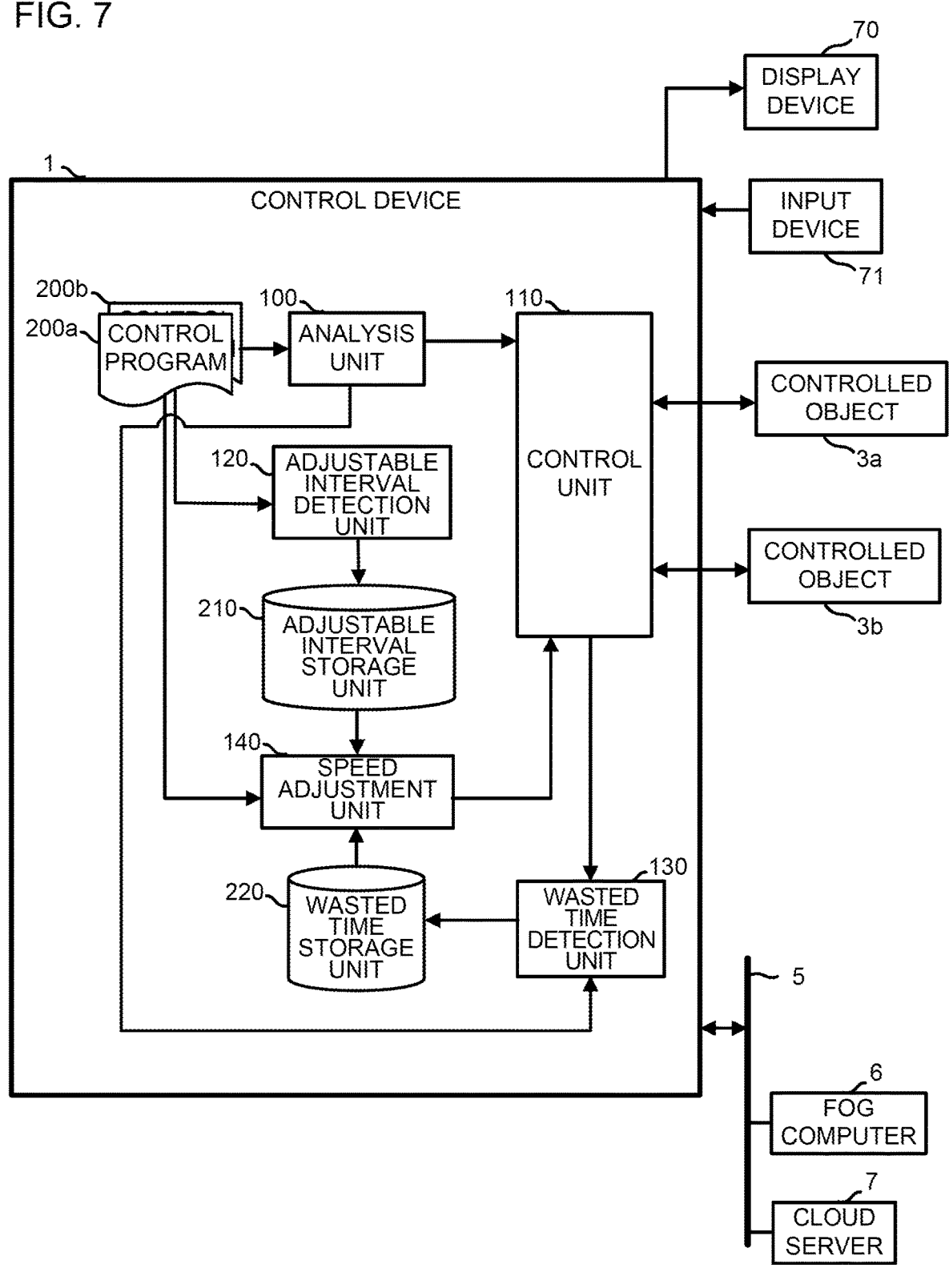
FIG. 7 is a schematic block diagram illustrating the functions of the control device according to a second embodiment.
Figure 9:
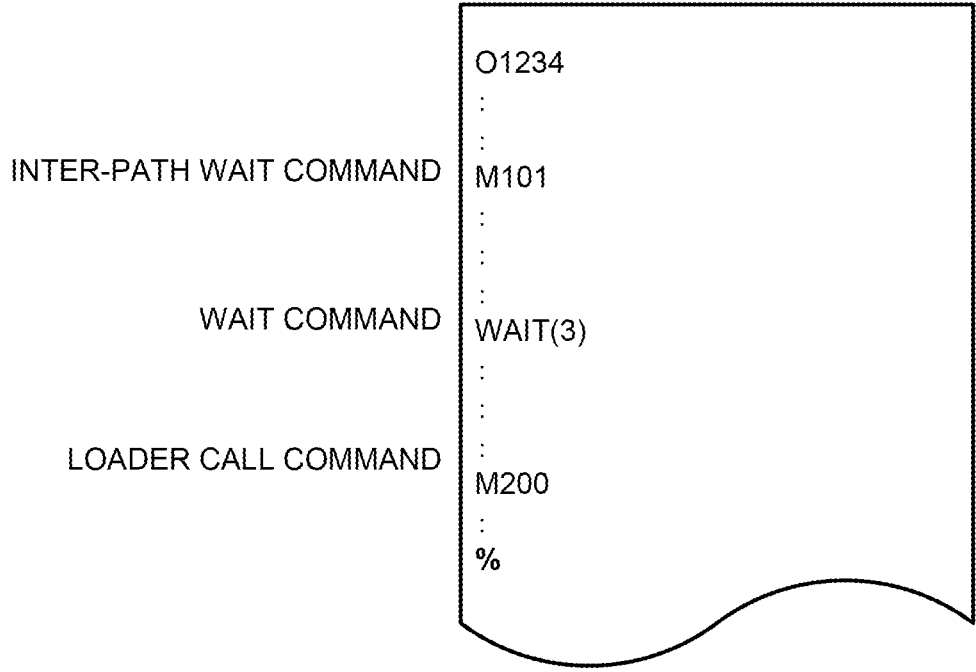
FIG. 9 is a diagram illustrating an example of a machining program that executes inter-path wait commands.

Hereinafter, a control device 1 according to a second embodiment of the present invention will be described with reference to FIG. 7.

The control device 1 of this embodiment includes an analysis unit 100, a control unit 110, an adjustable interval detection unit 120, a wasted time detection unit 130, and a speed adjustment unit 140, similarly to the control device 1 of the first embodiment. The RAM 13 and non-volatile memory 14 of the control device 1 store control programs 200*a* and 200*b* for controlling the controlled objects 3*a* and 3*b* respectively, and are each provided with an adjustable interval storage unit 210, which is an area for storing adjustable intervals in the control programs 200*a* and 200*b*, and a wasted time storage unit 220, which is an area for storing the positions and times in commands of the control programs 200*a* and 200*b* where wasted time occurs.

The analysis unit 100 in this embodiment has functions of prefetching and analyzing the control programs 200*a* and 200*b*. The analysis unit 100 also has a function of predicting the time it takes to execute each command of the control programs 200*a* and 200*b*. For prediction of command execution time, known techniques disclosed for example in Japanese Patent No. 4980458 or Japanese Patent Application Publication No. 2017-146859 may be used. As for peripheral devices, the standby state of the peripheral device is detected based on the signal acquired via the system or PLC 16 that manages the whole line where the controlled objects 3*a* and 3*b* are arranged, and then, the available time can be estimated from the received or previous execution times.

The adjustable interval detection unit 120 according to this embodiment detects an interval of a fast feed command in the commands in the control programs 200*a* and 200*b* as an adjustable interval at least during a first machining, and stores the interval in the adjustable interval storage unit 210. The adjustable interval detection unit 120 may detect a machining interval where an adjustment of machining conditions will not cause any major problem as an adjustable interval from the commands included in the control programs 200*a* and 200*b* and stores the interval in the adjustable interval storage unit 210.

The wasted time detection unit 130 according to this embodiment computes wasted time (waiting time and delay time) that will occur in a waiting included in the control programs 200*a* and 200*b* based on prediction results of machining time by the analysis unit, and stores the computed wasted time in the wasted time storage unit 220.

The functions provided by other configurations are the same as those of the first embodiment.

The control device 1 in this embodiment can prefetch the control programs 200*a* and 200*b* and detect adjustable intervals and wasted time in advance. Therefore, wasted time can be reduced from the first machining. If the prefetching by the analysis unit 100 is not sufficient, the machining is proceeded as normally. However, if the prefetching is sufficient, the available intervals within the prefetched range can be grasped in advance, so that at least one of the speed and acceleration can be adjusted within the prefetched range.

In order to further improve the accuracy, the function of predicting the machining time mentioned above may be used only in the first machining. In parallel with this, in the first processing, accurate adjustable intervals and wasted time detection may be performed, from the second machining onwards, at least one of speed and acceleration is adjusted based on the adjustable intervals and wasted time detected in the actual machining.

Figure 8:
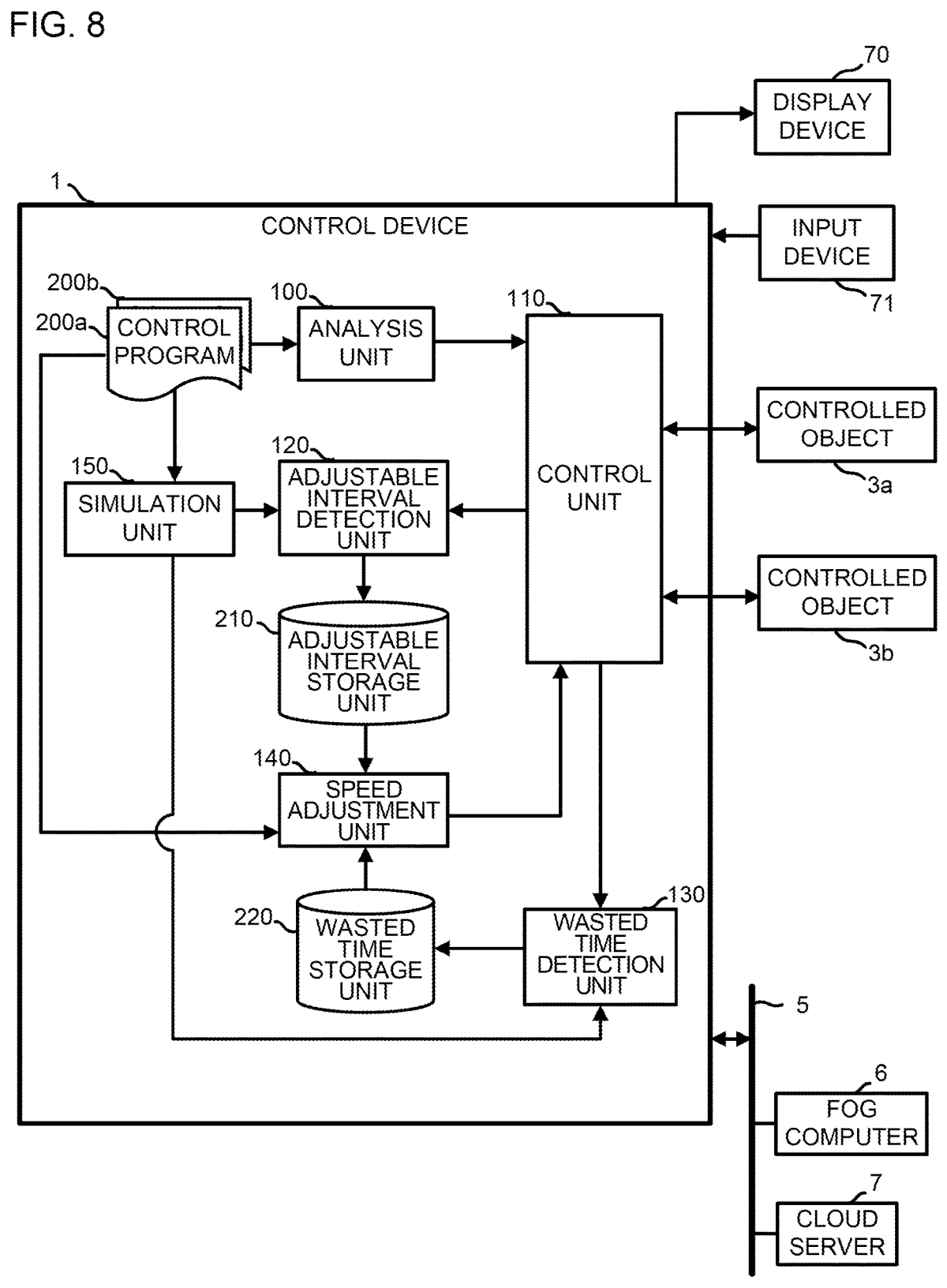

FIG. 8 is a schematic block diagram illustrating the functions of the control device 1 according to a third embodiment of the present invention. Various functions of the control device 1 of this embodiment are realized by the CPU 11 of the control device 1 illustrated in FIG. 1 executing a system program to control the operation of various parts of the control device 1.

The control device 1 of this embodiment includes an analysis unit 100, a control unit 110, an adjustable interval detection unit 120, a wasted time detection unit 130, and a speed adjustment unit 140, similarly to the control device 1 of the first embodiment, and further includes a simulation unit 150. The RAM 13 and non-volatile memory 14 of the control device 1 store control programs 200*a* and 200*b* for controlling the controlled objects 3*a* and 3*b* respectively, and are each provided with an adjustable interval storage unit 210, which is an area for storing adjustable intervals in the control programs 200a and 200b, and a wasted time storage unit 220, which is an area for storing the positions and times in commands of the control programs 200a and 200b where wasted time occurs.

The functions of the analysis unit 100, control unit 110, and speed adjustment unit 140 according to this embodiment are similar to those according to the first embodiment.

The simulation unit 150 is realized by the CPU 11 of the control device 1 shown in FIG. 1 executing the system program read out from the ROM 12 and primarily performing arithmetic processing using the RAM 13 and non-volatile memory 14. The simulation unit 150 performs known simulation processes based on the control programs 200a and 200b. For the simulation process, known techniques disclosed in for example Japanese Patent Application Publication No. 2003-291033 or Japanese Patent Application Publication No. H09-073309 may be used.

The adjustable interval detection unit 120 according to this embodiment detects an interval of a fast feed command, and an air cut interval that is an interval of a cutting feed command but does not involve contact between the workpiece and the tool, based on the results of the simulation process by the simulation unit 150, and stores these intervals as adjustable intervals in the adjustable interval storage unit 210. The adjustable interval detection unit 120 may also detect a machining interval where an adjustment of machining conditions will not cause any major problem as an adjustable interval based on the results of the simulation process by the simulation unit 150, and store this interval in the adjustable interval storage unit 210.

In addition, the wasted time detection unit 130 according to this embodiment computes wasted time (waiting time and delay time) that will occur in a waiting included in the control programs 200a and 200b as an adjustable interval based on results of the simulation process by the simulation unit 150, and stores the computed wasted time in the wasted time storage unit 220.

The functions provided by other configurations are the same as those of the first embodiment.

The control device 1 in this embodiment can detect adjustable intervals and wasted time in advance by a simulation process based on the control programs 200a and 200b. Therefore, wasted time can be reduced from the first machining. In order to further improve the accuracy, the function of predicting the machining time mentioned above may be used only in the first machining. In parallel with this, in the first processing, accurate adjustable intervals and wasted time detection may be performed, from the second machining onwards, at least one of speed and acceleration is adjusted based on the adjustable intervals and wasted time detected in the actual machining.

While one embodiment of the present invention has been described above, the present invention is not limited to the examples in the embodiment described above and may be carried out in various manners by adding suitable changes.

For example, in the embodiments described above, the speed adjustment unit 140 automatically determines an adjustable interval for adjusting at least one of speed and acceleration. Instead, an operator may be allowed to select an adjustable interval for the speed adjustment. In this case, at the time point when the first machining is completed, for example, a graph such as those shown in FIG. 3 and FIG. 5 is displayed in the display device 70 of the control device 1. Then, the operator is allowed to select an adjustable interval to be adjusted. In a system where a plurality of controlled objects are controlled in parallel, increasing an axis feed rate of a controlled object may sometimes cause adverse effects on a machined surface of another controlled object during machining. If such a interval becomes the target of speed adjustment, mechanical interference (such as collision) may occur between a plurality of controlled objects. Such a situation can be avoided by having the operator select an adjustable interval to be subjected to speed adjustment.

While the embodiments described above showed examples of controlling two controlled objects, the technique according to the present invention can suitably be applied to a case where three or more controlled objects are controlled. In the case of controlling three or more controlled objects, segments are formed by dividing each control program in advance with a wait command and a command for notifying a wait identifier. Then, when adjusting at least one of speed and acceleration in order to reduce the wasted time associated with a wait command and a command that notifies a waiting identifier, at least one of speed and acceleration may be adjusted for an adjustable interval within the range of the segment immediately before the wait command and the command that notifies the wait identifier. In addition, in the case where two or more controlled objects wait for another controlled object at the same time, or two or more controlled objects are delayed at the same time relative to another controlled object, an adjustment may be made to at least one of the speed and acceleration in order of length of wasted time of the paths from longer to shorter. By performing such adjustment, for example, from the beginning of the control program, it is possible to adjust the wasted time even when three or more control objects are being controlled.

REFERENCE SIGNS LIST

1 Control device
3a, 3b Controlled object
5 Network
6 Fog computer
7 Cloud server
11 CPU
12 ROM
13 RAM
14 Non-volatile memory
15, 17, 18, 20 Interface
16 PLC
19 I/O unit
22 Bus
30a, 30b Axis control circuit
40a, 40b Servo amplifier
50a, 50b Servo motor
70 Display device
71 Input device
72 External equipment
100 Analysis unit
110 Control unit
120 Adjustable interval detection unit
130 Wasted time detection unit
140 Speed adjustment unit
150 Simulation unit
200a, 200b Control program
210 Adjustable interval storage unit
220 Wasted time storage unit

The invention claimed is:

1. A control device that performs parallel control of a plurality of different controlled objects to machine a workpiece based on a control program, comprising a processor which is configured to:

analyze the control program and predict the time to execute each command;

control the plurality of controlled objects based on a result of analysis;

detect an adjustable interval in the control program;

detect wasted time that occurs in execution of commands in the control program that instruct the plurality of controlled objects to wait for each other based on prediction results of machining time by executing and performing arithmetic processing of the control program; and adjust at least one of speed and acceleration of a command that instructs movement of an axis of the controlled object in the adjustable interval of the control program such as to reduce wasted time.

2. The control device according to claim 1, wherein the wasted time is a waiting time of the first controlled object such that the time after a first controlled object among the plurality of controlled objects enters a wait state, a second controlled object different from the first controlled object enters a predetermined state in which the wait state is released, and the processor is further configured to reduce the waiting time by reducing at least one of speed and acceleration of a command relating to the movement of the axis of the first controlled object in an adjustable interval that is executed prior to the wait state.

3. The control device according to claim 1, wherein the wasted time is a delay time of the second controlled object such that the time after a first controlled object among the plurality of controlled objects enters a wait state, a second controlled object different from the first controlled object enters a predetermined state in which the wait state is released, and the processor is further configured to reduce the delay time by increasing at least one of speed and acceleration of a command relating to the movement of the axis of the second controlled object in an adjustable interval that is executed prior to the wait state.

4. The control device according to claim 1, wherein the processor is further configured to detect the adjustment interval based on states of the plurality of controlled objects being controlled by the control unit, and detect the wasted time based on states of the plurality of controlled objects being controlled by the control unit.

5. The control device according to claim 1, wherein the processor is further configured to prefetch and analyze a plurality of commands included in the control program and predicts execution times of the plurality of commands, detect an interval where no load is detected despite execution of a cutting feed command included in the control program as an adjustable interval at least during a first machining of a workpiece, and detect the wasted time based on predicted results of execution times of the plurality of commands.

6. The control device according to claim 1, the processor is further configured to execute a simulation process based on a plurality of the control programs, detect an adjustable interval based on a result of the simulation process at least during a first machining of a workpiece, and detect the wasted time based on a result of the simulation process.

\* \* \* \* \*